Patented Dec. 30, 1924.

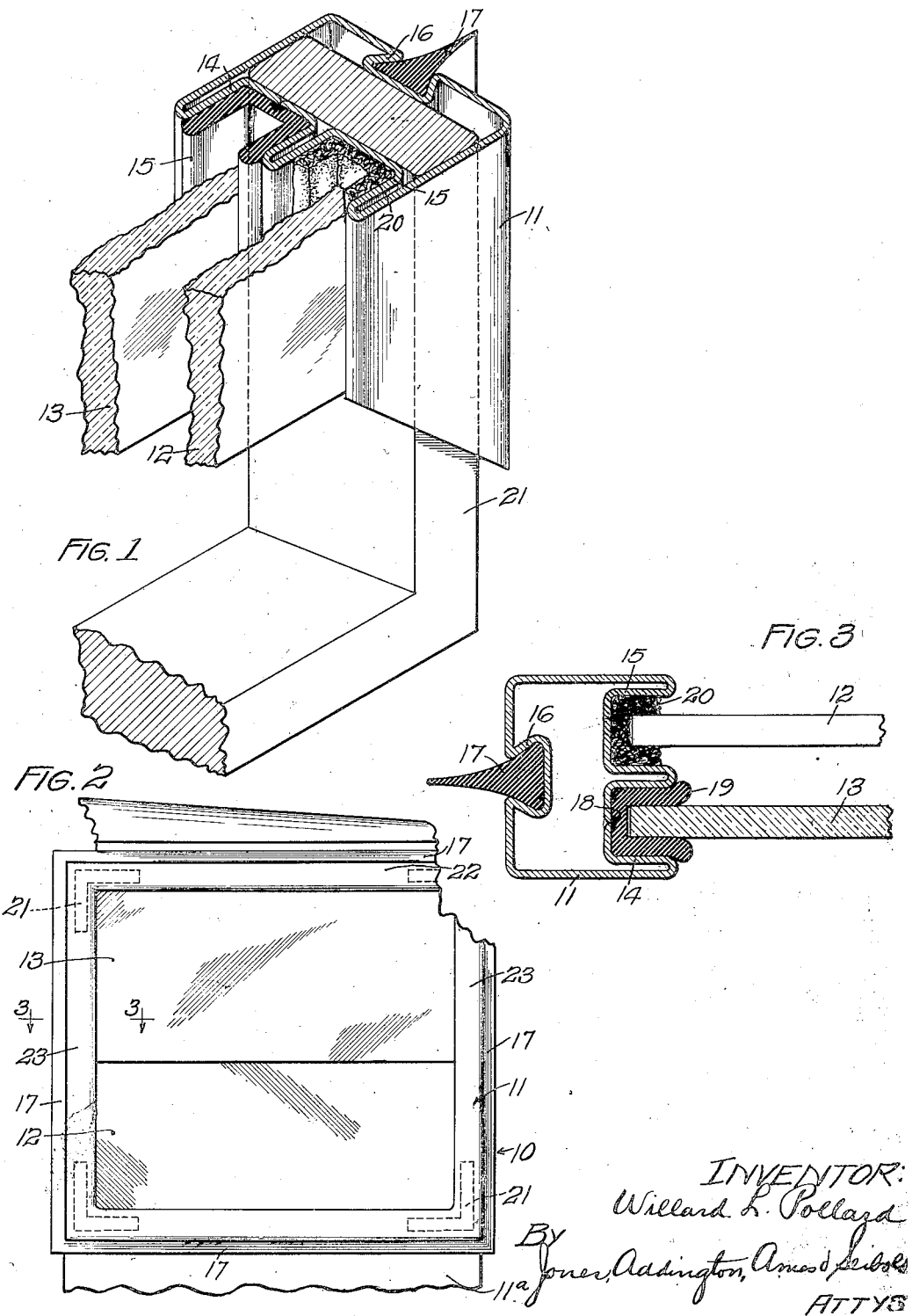

1,520,770

UNITED STATES PATENT OFFICE.

WILLARD L. POLLARD, OF EVANSTON, ILLINOIS, ASSIGNOR TO AIR-LITE AUTO TOP COMPANY, OF CHICAGO, ILLINOIS, A CORPORATION OF ILLINOIS.

AUTOMOBILE INCLOSURE CONSTRUCTION.

Application filed May 26, 1922. Serial No. 563,747.

*To all whom it may concern:*

Be it known that I, WILLARD L. POLLARD, a citizen of the United States, residing at Evanston, in the county of Cook and State of Illinois, have invented new and useful Improvements in Automobile Inclosure Constructions, of which the following is a full, clear, concise, and exact description, reference being had to the accompanying drawing, forming a part of this specification.

My invention relates to automobile inclosure construction.

One of the objects of my invention is to provide an improved ventilation and vision panel to close the space between the upper part of the car body and the top of the car.

A further object of my invention is to provide an improved ventilation and vision panel in which the frame will be light in construction and will not interfere with the vision.

A further object of my invention is to provide a ventilation and vision panel in which improved means are provided for mounting the panes of glass.

A further object of my invention is to provide a light ventilation panel in which improved means are provided for mounting the panes of glass and for connecting the frame sections together.

Further objects will appear from the detailed description to follow and from the appended claims.

In the drawings in which an embodiment of my invention is shown—

Figure 1 is a perspective view showing a portion of the frame with the corner bracket partly inserted;

Fig. 2 is a side elevation showing a complete panel mounted on a door; and

Fig. 3 is a horizontal sectional view showing one of the side frame members.

Referring now to Figs. 1, 2 and 3 in detail, the ventilation and vision panel 10 shown therein comprises the rectangular frame 11, shown as secured to the side 11ª of the car, and a pair of panes of glass 12 and 13, mounted in this rectangular frame.

The rectangular frame 11 is formed of light steel tubing, uniform in cross-section, and shaped to provide three reentrant portions as shown in Figs. 2 and 3, two of these reentrant portions 14 and 15 providing longitudinally extending channels to receive the edges of the panes of glass 12 and 13 and the third reentrant portion 16 providing a longitudinally extending channel to receive the rubber strips 17, which form a weathertight engagement against the adjacent construction.

The tubing may be formed of an elongated strip of sheet metal, formed as the section shown, and the seam where the edges of the strip are bent may be secured together by welding 18 or in any suitable manner which will give the desired strength and rigidity.

The lower pane of glass 13 is mounted in fixed position in the frame, the edges of the pane being seated in a suitable cushioning channeled member 19, which may be of rubber or felt. The upper pane of glass 12 is slidably mounted in the frame to move from a position in which it closes the opening above the lower fixed pane 13 to a position in which it lies substantially in juxtaposition to this lower pane, leaving a ventilation opening above the fixed pane.

In order to provide a suitable mounting in which the pane of glass 12 can slide, I provide a piece of milled felt 20, or other suitable material which will allow the edges of glass to slide freely.

In order to connect adjacent sections of the tubular frame together, I provide an L-shaped corner piece 21, the legs of which extend into the body portions of adjacent tubular sections as indicated in Figs. 1 and 2. If desired, the two side frame sections and the lower horizontal frame section may be welded together at the corners to provide additional strength and rigidity for the frame.

The upper horizontal frame section 22 is detachably secured to the vertical frame sections 23 by means of corner pieces 21 previously described, this upper frame member being removable to permit the insertion and removal of the panes of glass.

Having thus described my invention, what I claim as new and desire to secure by Letters Patent of the United States is:—

1. In combination with an automobile having a side and a top, with an open space between the upper edge of the side and the top, a ventilation and vision panel for closing said space comprising a substantially rectangular frame of slender metal tubing of thin sheet material of uniform cross-section, provided with two longitudinally extending sets of channels located side by side, the two sides of said frame forming slender hollow supporting columns extending upwardly from and secured to the upper edge of the side of the automobile, a vision panel of rigid transparent material having its edges mounted in one of said sets of the channels in said frame and closing a portion of the opening of said frame and a ventilation panel of rigid transparent material slidably mounted in the other of said sets of the channels of said frame and movable from a position in which it closes the remainder of the opening to a position which leaves the remainder of the opening free for signaling and ventilation, and flexible sealing strips mounted on and carried by the sides of said frame for sealing against adjacent panels.

2. A ventilation and vision panel for closing the space between the upper edge of the side and the top of an automobile, said panel comprising a substantially rectangular frame of slender metal tubing of thin sheet material of uniform cross section provided with two longitudinally extending sets of channels located side by side, the two sides of said frame forming slender hollow supporting columns adapted to be secured to the upper edge of the side of the automobile to extend upwardly therefrom, a vision panel of rigid transparent material having its edges mounted in one of said sets of channels in said frame and closing a portion of the opening of said frame and a ventilation panel of rigid transparent material slidably mounted in the other of said sets of channels in said frame, and movable from a position in which it closes the remainder of the opening to a position which leaves the remainder of the opening free for signaling and ventilation, and flexible sealing strips extending along the sides of said frame for sealing between adjacent panels.

In witness whereof, I have hereunto subscribed my name.

WILLARD L. POLLARD.